June 23, 1936. J. A. HOFFMAN 2,045,357
FUEL DISTRIBUTING MEANS FOR STOKERS
Filed July 17, 1934 3 Sheets-Sheet 1

Inventor
Jerome A. Hoffman,
By
Attorney

Inventor
Jerome A. Hoffman,
By
Attorney

June 23, 1936.  J. A. HOFFMAN  2,045,357
FUEL DISTRIBUTING MEANS FOR STOKERS
Filed July 17, 1934  3 Sheets-Sheet 3
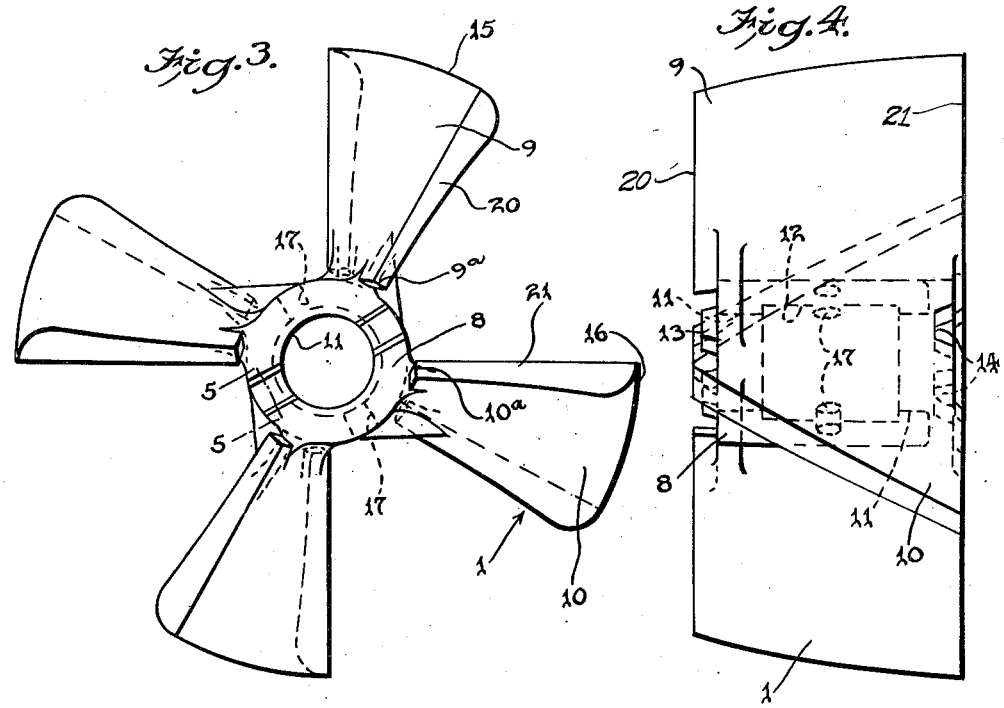
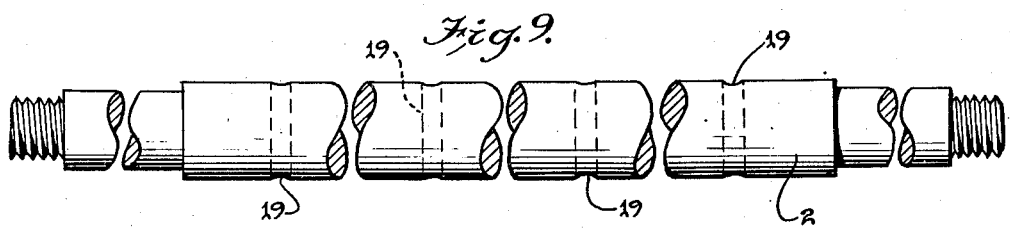
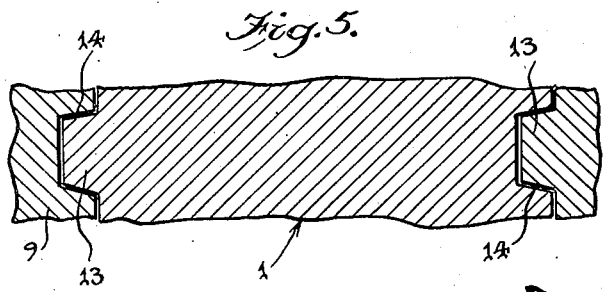
Inventor
Jerome A. Hoffman,
By
Attorney Patented June 23, 1936

2,045,357

UNITED STATES PATENT OFFICE 2,045,357

FUEL DISTRIBUTING MEANS FOR STOKERS

Jerome A. Hoffman, Detroit, Mich., assignor to Hoffman Combustion Engineering Company, Detroit, Mich., a corporation of Michigan Application July 17, 1934, Serial No. 735,682

3 Claims. (Cl. 198—128)

The invention relates to improvements in fuel distributing means for stokers.

The object of the present invention is to improve the construction of fuel distributing means for stokers having a fuel distributing chamber provided with an outlet and equipped with a rotary fuel distributor revoluble about a transversely extending horizontal axis and provided with blades adapted when the fuel distributor is revolving to deliver the fuel across a relatively long transverse path in a forward longitudinal direction into a combustion chamber across the fire maintained over and above a suitable grate.

A further object of the invention is to provide simple, practical and efficient fuel distributing means of strong, durable and comparatively inexpensive construction composed of distributing elements provided with four rigid radially disposed blades arranged in two pairs, one pair having right hand spirally sloped faces and the other pair having left hand spirally sloped faces the blades having the right and left hand sloped faces alternating, whereby the fuel delivered to the combustion chamber will be uniformly spread over the same.

A further object of the invention is to provide fuel distributing means having fuel distributing elements provided with rigid blades adapted to break up lumps of coal without liability of injuring the fuel distributing mechanism so that the latter will effectively and uniformly distribute the fuel over the combustion chamber.

With these and other objects in view, the invention consists in the construction and novel combination and arrangement of parts hereinafter fully described, illustrated in the accompanying drawings and pointed out in the claims hereto appended, it being understood that various changes, in the form, proportion and minor details of construction, within the scope of the claims, may be resorted to without departing from the spirit or sacrificing any of the advantages of the invention.

In the drawings:—

Fig. 3 is an enlarged side view of one of the fuel distributing elements.

Fig. 4 is an edge view of the same.

Fig. 5 is a detail sectional view taken substantially on the line 5—5 of Fig. 3 and illustrating the construction for interlocking the adjacent fuel distributing elements with each other.

Fig. 6 is a side elevation of a fuel distributing element illustrating another form of the invention.

Fig. 8 is a detail sectional view on the line 8—8 of Fig. 6.

Fig. 9 is an enlarged plan view partly broken away of the horizontal shaft on which the fuel distributing elements are mounted.

Figure 1:
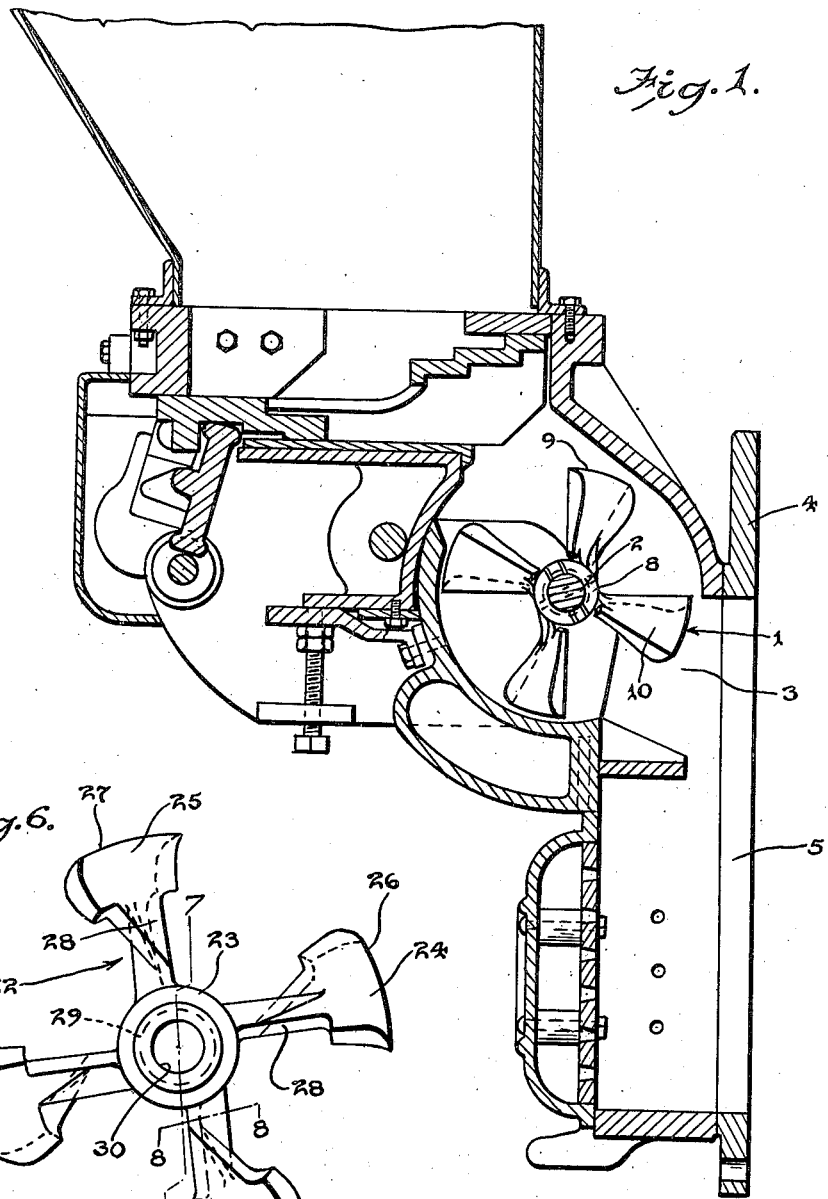
Figure 1 is a vertical sectional view of a portion of a stoker provided with fuel distributing means constructed in accordance with this invention.
Figure 2:
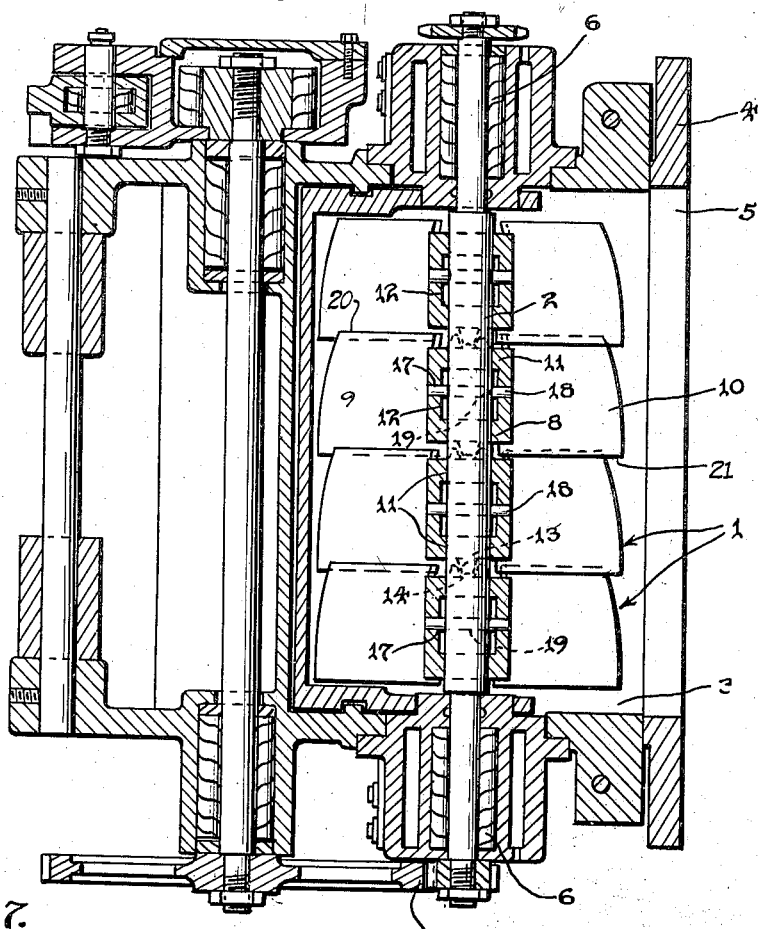
Fig. 2 is a horizontal sectional view of the same.

Referring particularly to the form of the invention illustrated in Figs. 1 to 5, inclusive, of the drawings, the rotary fuel distributing means comprises in its construction a plurality of similar fuel distributing elements 1 arranged side by side in a longitudinal series on a horizontal shaft 2 and located within a fuel distributing chamber 3 of the casing 4 of a stoker. The stoker may be of any desired construction of the type employing the fuel distributing chamber 3 having an outlet or discharge opening 5 through which the fuel is discharged into the combustion chamber of a boiler, furnace or the like, not shown. As the present invention relates solely to the novel construction of the fuel distributing means of the stoker and as the fuel distributing means may be employed in various forms of stokers of the said type a detailed description of the construction of the other features of the stoker is deemed unnecessary.

The horizontal shaft 2 which extends entirely across the stoker casing is mounted in suitable bearings 6 which are preferably water cooled and the said shaft is driven by a suitable gearing 7 which may be of any desired construction and which may be operated from any suitable source of power. As any suitable gearing may be provided for rotating the horizontal shaft and the distributing elements carried by the same a detailed description of the gearing is deemed unnecessary.

The fuel distributing elements 1 which are arranged side by side on the shaft 2 and which rotate with the same comprise a hub 8 and two sets of blades 9 and 10. The hub is bored at its ends at 11 to fit the shaft 2 and is preferably cored as indicated at 12 so that the boring at the ends of the hub at 11 is relatively short. Each hub is provided at its ends with positioning sections or portions 13 and 14, the positioning portion 13 at one end of the hub being formed by projections and the positioning portions or sections 14 at the other end being provided by recesses. The projecting portions 13 are of a shape to correspond to the recesses 14 so that the projecting portions at one end of the hub 8 will enter and fit the recesses 14 of the hub of an adjacent fuel distributing element.

Each of the fuel distributing elements, which constitute impellers or propellers, has two of the blades 9 which are oppositely disposed and two of the blades 10 which are also oppositely disposed with respect to each other. The blades 9 and 10 are alternately arranged and the blades 9 have fuel engaging faces at the front thereof facing the direction of normal rotation and having a right hand spiral slope while the blades 10 which are arranged between the blades 9 have front faces with a left hand spiral slope. The normal direction of rotation of the fuel distributing elements is counterclockwise in Figure 1 of the drawings and the slope or angle of the blade 9 is such as to throw the fuel to the right while the blade 10 is arranged to throw the fuel to the left.

The blades have front operating faces which extend outwardly radially from the hub and the faces of the blades 9 also extend along paths defined by right hand spirals while the blades 10 have operating faces which extend along paths defined by left hand spirals. Each of these operating faces is positioned or arranged so that it has a slope of approximately 30 degrees with a line or lines passing therethrough and which line is parallel to the axis of the hub, or in other words which is parallel to the axis of rotation of the shaft which carries the fuel distributing element. The blades are positioned so that the right and left hand sloping front operating faces alternately occur.

The front operating faces of the blades extend from the hub 8 to the outer edges 15 and 16 of the blades and while the blades of the propelling element throw or propel the fuel forwardly the blades of one pair of each distributing element tend to spread the fuel laterally to the right and the other pair of blades 10 to spread the fuel to the left so that the fuel will be evenly and uniformly distributed throughout the combustion chamber into which the stoker discharges.

The side edges 20 and 21 of the blades 9 and 10 are located slightly beyond the positioning and interlocking end portions 13 and 14 of the hub and when the distributing elements are assembled on the shaft 2 the blades of the adjacent distributing elements are arranged in slightly overlapping relation so that the fuel distributing means will operate continuously throughout its entire length from one side of the stoker casing to the other in delivering fuel to the combustion chamber. The blades 9 and 10 are provided at their inner ends with circumferentially spaced projecting radial edge portions 9ª and 10ª which are spaced from the hub and which lie slightly beyond the ends of the hub in close proximity thereto but spaced slightly therefrom.

The outer edge portions 15 and 16 of the blades are defined by a cylindrical surface, the axis of which is the axis of the shaft, or in other words the axis of the hub of the fuel distributing element. The fuel distributing elements are so shaped and proportioned that this cylindrical surface defines the outer extremity for each of the blades. Each fuel distributing element is also provided in its hub with pin receiving openings 17 adapted to enable the fuel distributing elements to be keyed or pinned to the shaft 2 by pins 18 passing through the said openings 17 and through openings 19 in the shaft 2. The pins fixedly secure each fuel distributing element in proper position on the shaft 2.

Figure 7:
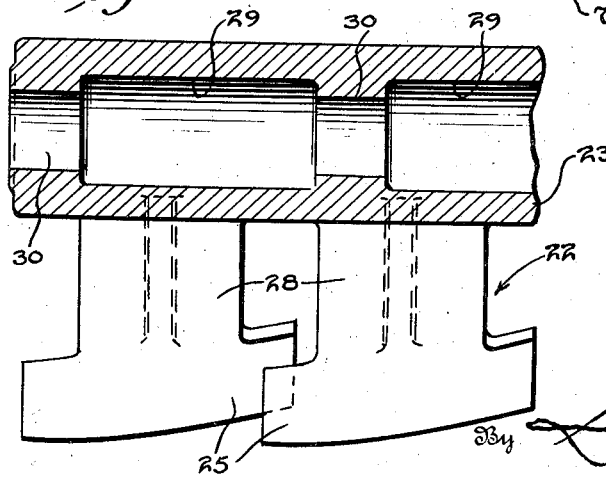
Fig. 7 is a detail sectional view taken substantially on the line 7—7 of Figure 6.

In Figs. 6 to 8, inclusive, of the drawings is illustrated another form of fuel distributing means 22 comprising a hub 23 and sets of blades 24 and 25 arranged in pairs in a manner similar to the blades of the fuel distributing element heretofore described and one set or pair having front right hand sloping faces and the other pair having front left hand sloping faces. The blades 24 and 25 which are formed integral with the hub extend outwardly radially from the hub. The blades which have right hand and left hand sloping faces are arranged so that in passing circumferentially around the fuel distributing means the right and left hand blades are alternately arranged and the outer edge portions 26 and 27 are defined by a cylindrical surface, the axis of which is parallel to the axis of the shaft about which the fuel distributing means rotates, or in other words parallel with the axis of the hub 23 of the fuel distributing means.

The blades 24 and 25 are provided with arms 28 formed integral with the blades and with the hub and approximately T-shaped in cross section, as clearly illustrated in Fig. 8 of the drawings.

The blades 24 and 25 extend laterally beyond the side edges of the arms 28 and as clearly illustrated in Fig. 7 of the drawings, the blades of the adjacent groups are arranged in overlapping relation. In this form of distributing means a single continuous hub 23 is provided with a plurality of groups of fuel distributing blades, each group being composed of two pair of blades arranged between the blades of the other pair and the blades of one pair of each group being provided with right hand sloping faces and the blades of the other pair of each group being provided with left hand sloping faces.

The single continuous hub may be provided with any number of groups of blades and it is cored at intervals at 29 and is bored at intervals at 30 to fit the shaft on which the hub is mounted and to which the hub is designed to be pinned or keyed in the manner heretofore described but any other suitable means may of course be employed for fixedly securing the continuous hub to the shaft.

What is claimed is:—

1. A fuel distributing element for stokers comprising a hub, and an annular series of outwardly extending screw-shaped fuel distributing blades formed integral with the hub and having right and left hand spiral or convolute slopes alternating throughout the series, said blades presenting front fuel engaging faces and straight parallel side edges extending from the hub to the outer ends of the blades, the blades being provided with radially arranged edges projecting beyond the ends of the hub and arranged in close proximity thereto and spaced slightly therefrom, whereby the hubs of adjacent distributing elements may be arranged in abutting relation with the projecting radial edges of the blades in overlapping relation from the inner ends of the blades to the outer ends of the same.

2. A fuel distributing element for stokers comprising a hub having a central opening and provided at its ends with positioning portions, the positioning portions at one end of the hub being formed by recesses extending into the body portion of the hub and the positioning portions at the other end of the hub being formed by projecting portions extending from the body portion of the hub, and an annular series of outwardly extending screw-shaped fuel distributing blades formed integral with the hub and having right and left hand spiral or convolute slopes alternating throughout the series, the outer peripheral edge of each blade being defined by a cylindrical surface, the axis of which is the axis of the hub, each blade having straight parallel side edges and being of a full width from its outer end to the hub greater than the length of the body portion of the hub whereby the blades of a plurality of distributing elements are disposed in overlapping relation throughout the entire length of the blades, said blades being provided with radial edge portions projecting beyond the ends of the hub and arranged in close proximity to the hub and spaced slightly therefrom, whereby the hubs of the adjacent fuel distributing elements may be arranged with their ends abutting against one another.

3. A fuel distributing element for stokers comprising a hub having a central opening and provided at its ends with positioning portions, the positioning portions at one end being formed by recesses extending into the body portion of the hub and the positioning portions at the other end being formed by projections extending from the body portion of the hub, outwardly extending screw-shaped fuel distributing blades formed integral with the hub in an annular series and having right and left hand spiral convolute slopes alternating throughout the series, each blade being of a full width from its outer edge to the hub greater than the length of the hub to arrange the blades of a plurality of sections in overlapping relation and the said blades presenting front operative fuel engaging faces and the operative face of each blade having a slope of approximately 30° with lines passing through the blade and extending in parallelism with the axis of the fuel distributing element, said faces having parallel sides from the outer ends of the blades to the hub and the blades being provided with radial edges projecting beyond the ends of the hub and located in close proximity thereto and spaced slightly therefrom whereby the blades may be arranged in the said overlapping relation with the ends of the hubs abutting against one another, and a radially arranged pin carried by the hub and extending through openings thereof and adapted to secure the fuel distributing member fixedly to a shaft in proper position thereon.

JEROME A. HOFFMAN.